(12) United States Patent
Samain

(10) Patent No.: US 6,342,268 B1
(45) Date of Patent: Jan. 29, 2002

(54) METHOD FOR TREATING A SOLID MATERIAL TO MAKE IT HYDROPHOBIC, MATERIAL OBTAINED AND USES

(76) Inventor: Daniel Samain, 100 chemin de Pechbusque, 31400 Toulouse (FR)

( * ) Notice: Subject to any disclaimer, the term of this patent is extended or adjusted under 35 U.S.C. 154(b) by 0 days.

(21) Appl. No.: 09/485,538

(22) Filed: Feb. 14, 2000

(30) Foreign Application Priority Data

Aug. 14, 1997 (FR) .......................................... 97 10364

(51) Int. Cl.⁷ .................................................. B05D 1/00
(52) U.S. Cl. ............................... 427/248.1; 427/255.6; 427/377; 427/378; 106/13; 428/410
(58) Field of Search ........................... 427/248.1, 255.6, 427/377, 378; 106/13; 428/410

(56) References Cited

U.S. PATENT DOCUMENTS

| | | |
|---|---|---|
| 2,130,150 A | 9/1938 | Nathansohn |
| 2,306,222 A | 12/1942 | Patnode |
| 2,824,778 A | 2/1958 | Robbart |
| 4,007,050 A | 2/1977 | Laufer et al. |
| 4,107,426 A | 8/1978 | Gordon |
| 4,339,479 A | 7/1982 | Robbart |
| 5,071,709 A | 12/1991 | Berquier et al. |

FOREIGN PATENT DOCUMENTS

| | | |
|---|---|---|
| FR | 693803 | 11/1930 |
| FR | 707688 | 7/1931 |
| GB | 588762 | 6/1947 |

OTHER PUBLICATIONS by R.D. Deanin et al., "Breathable, Permanent Water–Repellent Treatment of Cotton", Textile Research Jornal, Lowell Technological Institute, Lowell, Massachusetts, Nov. 1970, pp. 970–974.

*Primary Examiner*—Robert Dawson
*Assistant Examiner*—Mare S. Zimmer
(74) *Attorney, Agent, or Firm*—Young & Thompson (57) ABSTRACT

A solid material is treated, the chemical structure of which defines reactive protogenic hydrophillic functions accessible to gases, by applying at least one gas stream (3) onto at least one microdispersion (5) of at least one grafting reagent RX produced on the solid material, R being a hydrophobic group, X being chosen so that HX is volatile under normal conditions, R and X being chosen so that the reaction of RX on the hydrophillic functions produces covalent grafting of the hydrophobic group R with formation of the compound HX, it being possible for the reaction to be carried out in a solid/gas heterogeneous medium on all the reactive hydrophillic functions accessible to gases and only on these. The invention extends to the hydrophobic solid material obtained, and is applicable to the obtaining of natural or artificial fibrous or inorganic structures impermeable to water and to aqueous solutions and/or absorbing fats.

27 Claims, 2 Drawing Sheets

METHOD FOR TREATING A SOLID MATERIAL TO MAKE IT HYDROPHOBIC, MATERIAL OBTAINED AND USES

CROSS REFERENCE TO RELATED APPLICATION

This is the 35 USC 371 national stage of International application PCT/FR98/01808 filed on Aug. 14, 1998 which designated the United States of America.

FIELD OF THE INVENTION

The invention concerns a method for treating a solid material of which the chemical structure defines reactive hydrophillic functions accessible to gases, with a view to the covalent grafting of hydrophobic groups in order to make the material hydrophobic and/or lipophilic.

BACKGROUND OF THE INVENTION

It has known been for a long time (FR-707688); "Breathable, Permanent Water-Repellent Treatment of Cotton", Rudolph D. DEANIN et al., Textile Research Journal, Vol. 40, Nov. 11, 1970, pp 970), that it is possible to treat cellulosic textile materials by esterification in a liquid medium and in the absence of air with the aid of higher fatty acid derivatives in order to render these materials hydrophobic. To this end, a fabric is placed in at least one bath of a liquid solution comprising esterification reagents and a non-polar solvent which is neutral to the textile material, heated to a temperature of between 80° and 120° C. for fifteen or thirty minutes, and the fabric is washed and dried. FR-707688 states in addition that it is preferable to carry out esterification in the absence of air or oxygen.

This treatment in a heterogeneous liquid medium requires in practice several baths, a period of at least 15 min, washing and drying. It is therefore long, complex and costly and is reserved for laboratory use and cannot be exploited under satisfactorily profitable conditions on the industrial scale and for low cost materials.

Moreover, this treatment in a heterogeneous liquid medium cannot be considered for fragile materials such as non-wovens, agglomerates, paper, etc and/or those sensitive to solvents, such as cellulose acetates.

Similarly, FR-693 803 describes a method in which the textile material is immersed in a solution or an emulsion of a fatty acid anhydride in a solvent, is pressed and dried by heating, and is then subjected to a temperature above 35° C., preferably between 70 and 100° C. for approximately six hours.

Here again, the method is extremely long and costly and is not applicable to materials other than textiles.

In all cases, with these known methods in a liquid phase, if fatty acid chlorides are used as reagents, it is in practice necessary to neutralize the hydrochloric acid formed by adding a base in order to prevent acid hydrolysis of the cellulose fibres leading to total degradation of their mechanical properties. In addition, if fatty acid anhydrides are used as reagents, the presence of a catalyst such as pyridine or dimethyformamide is necessary for accelerating the reaction.

Consideration has already been given to attempts to make a cellulose material hydrophobic by acylation from organo-halogenosilane vapors, such as methyl chlorosilanes having a sufficiently low molecular weight so that they can be vaporized at temperatures compatible with the cellulosic material to be treated (U.S. Pat. Nos. 2,306,222; 2,824,778; 4,339,479; 4,007,050 etc.). In order to form and contain the vapors and to put them in contact with the material to be treated, a chamber must be provided for confining the vapors. Moreover, the hydrophobic character produced is slight and not very resistant and a subsequent neutralization treatment must be provided.

In particular, U.S. Pat. No. 2,824,778 describes a method in which a fabric is passed into a U-shaped conduit closed on itself, in which a gaseous mixture of a saturating low molecular weight silane vapor and an inert gas is maintained by means of equipment injecting silane in an atomized form into the conduit. This vapor phase method calls for a closed recirculation circuit to prevent silane vapors escaping, taking in account their low boiling point. It does not enable non-porous materials to be treated. It is moreover necessary subsequently to provide treatment in a neutralization bath.

U.S. Pat. No. 4,107,426 also describes a method for treating a cellulosic material by putting it into contact with aliphatic acid chloride vapors formed by heating a liquid aliphatic acid chloride in a confinement chamber so as to create in this chamber, kept at atmospheric pressure, a partial pressure of the vapors of between 10 mm Hg (1333 Pa) and 20 mm Hg (2666 Pa), with a dilution gas such as nitrogen which is introduced into the chamber. The gaseous mixture in the chamber is extracted via a condenser which makes it possible to extract the HCl gas formed and to recover the acid chlorides escaping from the chamber.

This method is complex to put into practice since it is necessary to put the solid material into, or in contact with, a sealed confinement chamber. It is indeed only really effective with grafting reagents containing 8 to 14 carbons and having a sufficient vapor pressure at temperatures lower than 150° C., the temperature at which cellulose starts to decompose, to be able to form a sufficient vapor pressure in the chamber. Accordingly, a temperature of 150° C. is recommended with lauric acid chloride and 180° C. with myristic acid chloride. No precise example is given for grafting hydrophobic groups having more than 14 carbons.

Moreover, the grafting reaction does not in practice have satisfactory kinetics and yield.

Accordingly, although the principle of making a solid material hydrophobic by esterification with the aid of fatty acid derivatives has been known for a long time, and in spite of various research projects carried out on this subject since 1930, no practical exploitation based on this principle has as yet been possible on an industrial scale.

It should be noted that with all the solutions proposed up to now for making solid materials hydrophobic by covalent grafting of hydrophobic groups, the yield and kinetics of the grafting reaction increase with temperature, and with the concentration of the grafting reagent in contact with the solid material (concentration in the bath in the liquid phase or vapor pressures in the vapor phase), and decrease with the number of carbons of the grafting reagent, namely with its hydrophobic character.

OBJECT OF THE INVENTION

The invention thus aims at overcoming these disadvantages and providing an extremely simple, rapid and low-cost treatment method which can be exploited in practice on the industrial scale, enabling a solid material to be made hydrophobic and/or lipophilic.

The object of the invention is in particular to provide a treatment method of which the yield and kinetics are sufficiently improved to be compatible with profitability on the industrial scale. The object of the invention is also to provide a method with which the consumption of grafting reagent is reduced and which does not create toxic effluents or residues in a substantial quantity.

The invention moreover aims more particularly at providing such a method which does not require the use of catalysts, nor of compounds for trapping or neutralizing the acids formed, nor subsequent washing.

The object of the invention is also to provide a treatment method applicable to many solid materials and, in a general manner, any solid material having reactive hydrophillic functions on its specific area accessible to gases. The object of the invention is thus not only to enable cellulosic materials to be treated but also other materials, in particular materials with an inorganic structure such as glass. The object of the invention is in particular to enable fragile materials to be treated and/or those sensitive to solvents (materials which crumble). The object of the invention is thus to provide novel hydrophobic and/or lipophilic materials obtained by such a treatment in order to open up the field of applications which can be envisaged with such materials, in particular with fragile materials and/or materials which crumble such as paper.

The object of the invention is also to provide a treatment for obtaining a very pronounced hydrophobic or lipophilic character by covalent grafting of hydrophobic groups which can contain 18 or more carbons, which resist external attack and which are stable with time over a period very much longer than a day, in particular of the order of several months or several years. The object of the invention is also to provide a treatment method which is as effective, or even more effective, with grafting reagents having a greater number of carbons.

The object of the invention is also in particular to provide a treatment method for making the windshields of vehicles hydrophobic for a long period, in particular for several months.

The invention also makes it possible to carry out such a treatment in situ, i.e. in the place where the solid material is used, without the necessity for transporting it to a specific treatment site.

The object of the invention is also to provide a method for rapidly treating large areas of solid material, so that it is applicable on the industrial scale with good productivity and enables large-size parts (windshields, rolls of printing paper at high throughput rates etc) to be treated uniformly.

SUMMARY OF THE INVENTION

To this end, the invention concerns a method for treating a solid material of which the chemical structure defines reactive protogenic hydrophillic functions accessible to gases with a view to the covalent grafting of hydrophobic groups onto these protogenic hydrophillic functions, wherein:

at least one grafting, reagent RX is chosen, where R is a hydrophobic group, selected so that it can be in the liquid state under atmospheric pressure at a temperature of at least 200° C. and so that it can react on the said hydrophillic functions at least under certain reaction conditions by producing covalent grafting of the hydrophobic groups R onto the said hydrophillic functions with formation of a volatile compound HX under the reaction conditions, at least one microdispersion is produced of a liquid composition comprising at least one grafting reagent RX, on at least one part of the solid material, at least one gas stream, which is neutral to the grafting reaction of RX on the said hydrophillic functions, is applied at a temperature below the boiling point of the grafting reagent(s) RX, so that the grafting reaction is carried out by diffusion of the grafting reagent(s) in a heterogeneous medium on all the hydrophillic functions of the solid material accessible to the gases (mainly on those situated downstream from the microdispersion in relation to the direction of movement of the gas stream), and only on these functions.

"Reactive protogenic hydrophillic function" is understood to mean any hydrophillic hydrogen donor function of the type —YH where Y is a hetero-atom, and which is able to react chemically with a hydrophobic group to establish a covalent bond between them, and in particular any hydrophillic function having at least one hydrogen which is active in an acylation reaction (—OH, —NH$_2$, Si(OH) etc).

In order to be reactive, a hydrophillic function must not be already involved in another bond such as a constitutive hydrogen bond or an ionic bond.

"Covalent grafting" designates any covalent bond between a group and the molecules constituting the solid material.

"Microdispersion" is understood to mean a dispersion of liquid droplets distributed on the solid material, in particular having a mean diameter of less than 100 Am, typically of the order of a micron or less.

A microdispersion according to the invention may be produced on at least part of at least one first free outer face of the solid material (by spraying directed onto this first free outer face of the solid material, or by application of a solid support loaded with the liquid composition in contact with this first face, or may be produced by wetting, for example by instantaneous immersion in a bath of the liquid composition containing a volatile solvent, followed by evaporation of this volatile solvent), and/or may be produced within the solid material over part or all of its thickness if the solid material is porous (by spraying onto at least part of at least one first free outer face of the solid material, or by application of a solid support loaded with the liquid composition in contact with this first face, or by wetting this first face). Advantageously and according to the invention, in order to produce the said microdispersion, a quantity of liquid composition containing at least one grafting reagent is applied in contact with at least one first free outer face of the solid material.

Advantageously and according to the invention, a gas stream is applied to at least one free outer face of the solid material, identical or not to the said first face.

The microdispersion is preferably produced on the solid material before applying the gas stream to the solid material.

Alternatively, the gas stream can also be applied to the solid material at the same time as a microdispersion is produced. In this case, care should be taken to prevent vaporization of the liquid composition before it is placed in contact with the solid material to produce the microdispersion.

Advantageously and according to the invention, at least one microdispersion is produced of at least one liquid composition including at least one grafting reagent RX, by spraying directed towards the solid material (i.e. with a nozzle directed towards one face of the solid material) and/or by contact of the said first face with at least one solid support previously loaded with a liquid composition mainly consisting of at least one grafting reagent RX in the liquid state and/or by wetting the solid material with a liquid composition formed of a solution of at least one grafting reagent RX in a neutral volatile solvent. The said solid support previously loaded with liquid composition may be chosen from an absorbent pad applied to the solid material (for example of the felt type), a non-absorbent pad (for example of the dating pad type), an absorbent or non-absorbent roller driven in rotation by rolling on the said first face of the solid material (for example of the paint roller or printing machine inking cylinder type), or a brush or the equivalent.

In order to wet the solid material, it may be instantaneously immersed in a bath of the liquid composition. As soon as it leaves the bath, the neutral volatile solvent evaporates, only leaving in place micro-droplets of the grafting reagent(s) RX dispersed on the solid material.

The quantity of liquid composition applied must be very low so as, in particular, to provide the gas stream with access to the protogenic hydrophillic functions accessible to gases and to enable the grafting reagent RX to be entrained by the gas stream. The microdispersion must in particular be permeable to gases. Failing this, it would be possible for the method according to the invention to be carried out, but it would quite unnecessarily require a much longer period, the effect of the gas stream being first of all to blow away the excess of liquid composition until a true microdispersion was obtained. A small quantity of the grafting reagent RX results in a low production of HX formed.

The liquid composition used may be formed of a grafting reagent RX or of a mixture of grafting reagents RX in the liquid state, without a solvent. In this case, it should be noted that the liquid composition does not in general migrate into the centre of the solid material, even when this is porous. On the other hand, as soon as the gas stream is applied, the grafting reagent RX migrates towards the hydrophillic functions situated downstream.

The liquid composition may also incorporate a solvent, in particular a volatile neutral solvent in the case in particular of a microdispersion produced by wetting. This volatile solvent is for example chosen from the group formed of petroleum ethers, low molecular weight alkyl esters (such as ethyl acetate) or chlorinated solvents (such as trichloroethylene).

Advantageously and according to the invention, the gas stream is directed towards at least one free outer face of the said solid material with a component of the velocity perpendicular to this face which is not zero, the gas stream being applied to this outer face with an incident velocity which is not zero.

Advantageously and according to the invention, the gas stream is applied continuously and a gas flow coming from the said solid material is evacuated so as to prevent any recirculation onto the said solid material. The gas flow coming continuously from the solid material makes it possible in particular to evacuate continuously the volatile compound HX formed. Since the quantity of HX formed is very low, its evacuation into the open atmosphere or its retreatment does not present any problem.

It should be noted in particular that, unlike former vapor phase treatment methods, in a method according to the invention, the microdispersion of grafting reagent(s) is in the liquid state on or in the solid material, the gas stream is at a temperature lower than the boiling point of the grafting reagent(s), and the method is carried out without recirculation, i.e. in an open circuit (in particular in a chamber for confining the gases in contact with the free material). The result of this is that the diffusion and reaction phenomena on the hydrophillic functions of the solid material are completely different in their nature and effects.

The gas stream applied according to the invention onto the solid material has the function of bringing about entrainment of the grafting material initially placed in microdispersed form in the liquid state on the solid material on all the sites of the reactive protogenic hydrophillic functions accessible to gases, and of removing any excess; it has the function of enabling the grafting reaction to take place; it has the function of entraining the volatile compound HX formed by the reaction; and it has the function of greatly encouraging the kinetics of the reaction by removing HX and displacing the grafting reagent from the already grafted sites to sites not yet grafted.

In point of fact, a reaction between a solid material having on its surface reactive functions YH and a grafting reagent RX, may be written according to the following equation (I):

$$\text{(Material) - YH} + \text{RX} \underset{K2}{\overset{K1}{\rightleftarrows}} \text{(Material) - YR} + \text{HX} \qquad \text{(I)}$$

where HX is a volatile compound and K1 and K2 are velocity constants in the direction of formation and dissociation respectively. The rate of reaction may be written:

$$V=K1[YH][RX]-K2[YR][HX]$$

At the start, the reaction proceeds with a high velocity since there is no negative contribution from the second term of the expression. In a closed system, this rate however reduces rapidly with the increase in concentration of YR and of HX and tends to be cancelled out. The reaction is not complete and tends to arrive at an equilibrium. In order to permit the reaction to proceed, it is necessary to reduce the concentration of YR and HX or to increase that of RX.

In the prior art this is, for example, achieved in the liquid phase by adding either a large excess of the reagent RX or a base to trap HX when this is an acid. In the vapor phase, an attempt was made in the prior art to increase the excess of grafting reagent by keeping the grafting reagent vapors RX in a confinement chamber in contact with the solid material to be treated, with as high a vapor pressure as possible.

Advantageously and according to the invention, the solid material is placed in a treatment space adapted so as to minimize, or even prevent, according to the characteristics of the gas stream, any return onto the solid material of the gas flow coming from the solid material. If the solid material is non-porous or only slightly porous, the treatment space must be sufficiently large in the transverse direction with respect to the incident gas stream so that the gas flow can be evacuated without being recirculated to the solid material. The side walls of the treatment space surrounding the solid material must not come into contact with the solid material in the transverse direction.

If it is perfectly porous, the solid material may be placed in a treatment space which is smaller in the transverse direction, and in particular substantially of the same transverse size as the solid material. However, application of the gas stream and evacuation of the gas flow coming from the solid material is then carried out in open circuit.

Whether the solid material be porous or non-porous, advantageously and according to the invention, the said solid material is placed in a treatment space adapted according to the characteristics of the gas stream so that the quantity of gas flow coming from the said solid material which can once again be brought onto the solid material by the gas stream is zero or negligible. For example, the solid material is placed in a ventilated oven or in an open atmosphere under an extraction hood evacuating the said gas flow to the outside. The treatment space is adapted so that, if the treatment space is sufficiently large, the compound HX formed is extracted by dilution from the solid material as it is formed, and/or is extracted by forced evacuation. Advantageously, the treatment space is then not hermetically sealed but is on the contrary open. The method according to the invention may be put into operation with fresh air in an open atmosphere.

The compounds HX and RX are entrained by the gas stream at extremely different rates since they have very different volatilities. They are therefore completely separated from each other, and also separated from the already grafted sites of the material. The fact of simply applying a gas stream makes it possible to maintain the reaction rate at its very high initial level while constantly and very efficiently extracting the two reaction products (the treated material YR and HX) from the reaction medium. The reaction medium is not therefore static as in former reaction systems but migrates rapidly through the solid material, bringing about its conversion as it passes. This movement encourages the reaction and considerably increases its kinetics, as well as its yield, since it is no longer necessary to work with an excess of reagent. It makes it possible moreover to prevent any deleterious effects of HX on the material. The diffusion of the reagent associated with its migration moreover makes it possible to ensure complete grafting of all the sites of the material.

The gas stream is advantageously chosen so as to be itself as neutral as possible as regards the grafting chemical reaction, i.e. it must not itself react on the reactive hydrophillic functions, or with the grafting reagent, nor must it hinder their mutual reactions.

In particular, the gas stream is aprotic. Accordingly, it does not contain protogenic functions such as —OH, —NH$_2$, —SiOH, —SH, or it contains as small a quantity as possible. Similarly, the gas stream does not contain water or contains as low a quantity as possibly. Equally, the gas stream does not contain the compound HX or contains as low a quantity as possible. It is free from the gaseous grafting reagent RX. Advantageously, the gas stream is free from the grafting reagent RX before being applied to the microdispersion.

Nevertheless, it should be noted that it is possible, in a variant of the operating method of the invention, to apply a gas stream and a stream of grafting reagent(s) simultaneously in the form of a spray directed onto at least one free outer face of the solid material. In this case, the gas stream contains the grafting reagent(s) in the liquid state, and it is desirable that the temperature of the gas stream should be as low as possible so as to prevent any vaporization of the grafting reagent(s) before arrival on the solid material. However, it is then necessary to provide a subsequent step during which a gas stream free from the grafting reagent RX is applied at a higher temperature in order to encourage the grafting reaction.

It is found in practice that the method according to the invention may be carried out with ambient air and with a material which is not previously dried. The gas stream may thus be quite simply atmospheric air or dry air. It is also possible to use any other neutral aprotic neutral gas, for example pure nitrogen or an organic gas such as carbon dioxide, so as in particular to prevent the phenomena of oxidation of the material or of the reagent.

The physical characteristics of the gas stream (velocity, flow rate, temperature, pressure, dimensions) are adapted in relation to the solid material to be treated and the operating conditions selected. In particular, a gas stream is chosen having a sufficiently low velocity so that the dwell time of the grafting reagent on the material at the chosen reaction temperature is sufficiently long to allow time to react with all the sites of the solid material to be treated (reactive protogenic hydrophillic functions accessible to the gases), taking into account the kinetics of the reaction. Moreover, a gas stream is used at a temperature greater than the melting point of the grafting reagent(s) RX and is chosen so as to encourage entrainment of the grafting reagent(s) by the gas stream, and the grafting reaction of the hydrophobic groups R on the hydrophillic functions of the solid material to be treated.

In this respect, it should be noted that the grafting reagent RX is entrained by the gas stream but is subject to retention by the solid material. This entrainment is achieved by virtue of the dynamic equilibrium which exists at any instant between the molecules of the grafting reagent(s) present in the liquid state and those which exist in the gaseous state. The value of this equilibrium at a given temperature determines the vapor pressure of the grafting reagent at this temperature. Under the conditions of the invention, this equilibrium is displaced considerably in favor of the liquid form since the working temperature is in particular lower than the boiling point of the grafting reagent and the vapor pressure is therefore low. The inventor has nevertheless found that the fact of applying a gas stream without a confinement chamber for the vapors makes it possible to entrain all the grafting reagent, displacing in fact only a very small fraction present in the gaseous state. Since the equilibrium between the liquid and gaseous phases has been interrupted by the gas stream, this brings about the passage in the vapor state of a few molecules of liquid grafting reagent as well as, reciprocally, the passage in the liquid state of a few molecules previously in the vapor state. Since the latter have been entrained by the gas stream, the result is finally a total displacement of the grafting reagent present in the liquid and gaseous form by the gas stream to the protogenic hydrophillic functions of the solid material. This continuous passage between the liquid and vapor phases makes possible, in combination with the displacement effect created by the gas stream, the general entrainment of the grafting reagent through the solid material onto all the protogenic hydrophillic functions accessible to gases. It is thus possible to define a dwell time of the grafting reagent RX which corresponds to the time which causes the grafting reagent RX to pass through the solid material under the effect of the gas stream. This dwell time is associated: (i) with the physical characteristics of the gas stream and (ii) with the physico-chemical characteristics of the grafting reagent RX (in particular its vapor pressure).

In point of fact, it has been shown that:

$$\log tr = a + b \cdot (Teb/To) - \log D$$

where:
tr is the dwell time of the grafting reagent RX per unit length of the solid material traversed,
Teb is the boiling point of the grafting reagent RX at atmospheric pressure, which is above 200° C.,
To is the temperature of the gas stream, below Teb,
D is the volume flow of the gas stream,
a and b are constants.

The grafting reaction is even more encouraged, as regards yield, if the reagent RX has a long dwell time on the solid material and the reaction kinetics are high.

In this respect, it has been shown that the yield R of the reaction may be written:

$$R = Vm \times tr$$

where:

Vm is the mean grafting reaction rate.

Now, it is known that Vm complies with the formula:

$$\log Vm = c + d.To$$

where:

c and d are constants.

Consequently:

$$\log R = a + b.(Teb/To) + c + d.To - \log D$$

From these formulae it will be seen that:

the yield of the reaction is very little dependent on To, the temperature of the gas stream, which has been verified by experiment;

the yield depends essentially and exponentially on Teb; the best yields are thus obtained, by virtue of the invention, with the most hydrophobic grafting reagents (having the most carbons), and this surprisingly and contrary to all previous methods;

the yield and the dwell time are encouraged by a low flow rate; the minimum and optimum flow rate of the gas streams to be used is that which enables the compound HX formed to be evacuated;

since the average kinetics also depend in an exponential manner on To, it is possible to choose To and Teb in order to optimise both the kinetics and yield of the reaction at the same time.

Accordingly, it should be noted that a method according to the invention is similar to well-known vapor phase chromatography phenomena, as regards entrainment of the grafting reagent RX by the gas with respect to the solid material. For example, it is possible to determine experimentally, by a means of a vapor phase chromatography experiment, the dwell time of a grafting reagent on a given solid material, with a given flow rate and temperature.

In practice, the inventor has found that the dwell time of grafting reagents RX may be very short and compatible with use on an industrial scale, in particular with continuous application of the method according to the invention.

If the solid material is porous and if the said microdispersion of grafting reagent(s) is prepared on the same face as that on which the gas stream is subsequently applied, all the material is treated, all the outer faces and the core of which become hydrophobic. On the other hand, in the case of an undivided porous solid material, if the gas stream is applied in the opposite direction, i.e. if the said microdispersion of grafting reagent(s) is produced on a face receiving the gas flow coming from inside the solid material, only the face on which the microdispersion has been produced is treated. It should be noted that the free outer face(s) of the solid material receiving the gas stream and/or the microdispersion of grafting reagent(s) may be flat or take any other form.

Advantageously and according to the invention, the gas stream is applied for a period corresponding to the minimum dwell time tr, and enables any possible excess of grafting reagents to be eliminated by the gas stream. This period is more often less than 1 min. In general, the period of application of the gas stream would be of the order of a few seconds, or even less than one second.

The gas stream may be formed by any appropriate means, for example with the aid of one or more fans positioned so as to operate in compression and/or in extraction.

Advantageously and according to the invention, X is a halogen and in particular chlorine. Moreover, R is advantageously an organic hydrophobic group containing less than 50 carbons. An organic group containing more than 6 carbons, in particular between 8 and 50 carbons, is in general hydrophobic and may be used as the group R. Advantageously and according to the invention, R is chosen from an acyl derived from a fatty acid containing more than 14 carbons and in particular between 18 and 50 carbons. Advantageously and according to the invention, RX may be an aliphatic acyl halide derived from a fatty acid including more than 14 —$CH_2$ units. As mentioned above, the most important criteria are the boiling point Teb and the hydrophobic character.

The boiling point Teb at atmospheric pressure of each grafting reagent RX is above 200° C. In this way, it is certain that the grafting reagent is in the liquid state at the temperature and pressure of the gas stream.

On the other hand, in former methods in the vapor phase, compounds are used having a boiling point as close as possible to the treatment temperature.

It has in addition been verified experimentally in a treatment according to the invention that if a first grafting reagent RX with a Teb very much lower than 200° C. is mixed with a second grafting reagent RX with a Teb very much greater than 200° C., only the second reagent is grafted.

Advantageously and according to the invention, when the solid material includes reactive hydrophillic functions belonging to the group formed of alcohol-OH, amino-$NH_2$ and mercapto-SH functions, at least one grafting reagent RX is chosen in which R is an acyl which may be aliphatic or aromatic, which may or may not contain one or more hetero-atoms, and which may be saturated or unsaturated. For example, R may be a perfluorinated alkyl group, the hydrophobic character of which is much more marked than the perhydrogenated alkyl group of the same carbon skeleton. However, R then incorporates functions such as amide functions making it possible, for the same number of carbons, to increase the boiling point and the yield of the grafting reaction.

Advantageously and according to the invention, when the solid material includes reactive hydrophillic functions belonging to the group formed of —SiOH, —OH, —$NH_2$, and —SH functions, at least one grafting reagent RX is chosen in which R is an R1-Si— group, where R1 is an organic hydrophobic group. Advantageously and according to the invention, R1 contains more than 6 carbons and less than 50 carbons and is an alkyl or an aryl, which may or may not contain one or more hetero-atoms (for example fluorine) and which may be saturated or unsaturated.

When the solid material comprises at least one cellulosic material (paper, textile, natural or artificial fibres, wood, etc), at least one grafting reagent RX is chosen formed of a halide of fatty acids and more particularly behenic acid chloride with which a significantly greater hydrophobic character is obtained than that obtained with other acid chlorides with a lower weight. Stearic acid chloride may also advantageously be used for many applications, taking into account its low price. Several distinct grafting reagents may be grafted simultaneously either by mixing them or by putting them simultaneously into contact with the gas stream, or by using distinct sources for each of them.

When the solid material is made of glass or silica, use is advantageously made, as the grafting reagent, of a halogeno-organosilane with formula R1-Si—X for example a chloro-octadecyl-silane.

It should also be noted that the grafting reagents which can be used according to the invention may be of a lipidic nature, i.e. R may be a lipidic hydrophobic group.

The inventor has thus found, in a surprising manner, successively that:

- although the grafting reagents, which are hydrophobic compounds, have a very high boiling point (for example stearic acid chloride boils at 156° C. under 20 Pa), or do not possess a boiling point (i.e. decompose before boiling), it is in fact possible to prepare a gas stream entraining such hydrophobic compounds,
- grafting reagents microdispersed in the liquid state and then entrained in this way in a gas stream have a very much greater reactivity than they have in liquid solution (in an aprotic solvent),
- such a treatment may be carried out under normal or near normal pressure conditions and at temperatures comprised in an interval between ambient temperature (20° C.) and 250° C., in a few seconds, without a catalyst or solvent applied to the solid material and, particularly surprisingly, with increased efficiency.

The treatment according to the invention makes it possible to obtain a solid hydrophobic material. It should nevertheless be noted that it is possible to provide the solid material with other properties according to the characteristics of the grafted hydrophobic groups R. Accordingly, it is possible to choose hydrophobic groups R which may have in addition other properties, in particular which may be oleophobic (if the group R is a perfluorinated organic group), and which are protectors against ultra violet rays and/or absorb ultraviolet rays, coloured rays etc.

In spite of an extremely rapid treatment, the hydrophobic character of the solid material treated according to the invention is particularly clear cut and considerable. In particular, it is found that this hydrophobic character is obtained with a low level of grafting of the hydrophobic groups. A possible explanation of this extremely surprising result is associated with the fact that in order to obtain this hydrophobic character, it is necessary and sufficient for all the specific area of the solid material accessible to gases to be treated with hydrophobic groups. Now, this is precisely the effect obtained by a method according to the invention. Indeed, due to the gas stream, all the sites of the solid material accessible to gases are treated even when the solid material is porous (macroporous, mesoporous or even microporous). In addition, contrary to previous methods in a liquid phase, the internal structure of the solid material is not affected by the treatment according to the invention.

In most cases, it is also found that the hydrophobic character of the solid material treated in this way according to the invention, has very great durability (resistance with time to environments destructive to the hydrophobic character). Nevertheless, the inventor has also found, in the case of fibres or fibrous structures containing polymeric macromolecules, that this durability is also linked to the degree of crosslinking of the polymeric macromolecules. In particular, if these polymeric macromolecules are not crosslinked or very slightly crosslinked, the durability of the hydrophobic character is low. For example, in the case of a cotton fabric, the hydrophobic character tends to disappear after washing with a detergent. The same applies, for example, in the case of certain polysaccharides such as starch or dextran, of which the molecules have very high rotational mobility. Thus, when a method according to the invention is applied to the treatment of a natural or artificial fibre or fibrous structure comprising polymeric macromolecules, this method is characterized in that a crosslinking treatment of the polymeric macromolecules is first of all carried out (for example by reaction with epichlorohydrin).

On the other hand, when the solid material to be treated has already a rigid, for example inorganic, structure or has crosslinked polymeric macromolecules, it is unnecessary first of all to carry out a crosslinking treatment. Such is the case in particular with wood, glass or glass wool, silica etc.

Moreover, advantageously and according to the invention, after having carried out treatment by the gas stream and the grafting reagent(s), at least one free outer face of the material is then coated with a hydrophobic composition, for example one based on silicone oils, waxes, etc. Indeed these compositions then have a very strong affinity for the material treated according to the invention, and a distinct improvement to strength and wettability is found in practice.

The method according to the invention has many advantages compared with the prior art, and in particular the following:

- very rapid reaction times make it possible to work at relatively high temperatures and the material and grafting reagent are indeed only subjected to these high temperatures for a very short time;
- harmful reaction byproducts, such as gaseous halogenated acids, are produced in very low quantities and entrained in the gas stream. In particular, the reaction may be carried out on coloured materials or with relatively fragile grafting reagents and these may, in point of fact, be easily prepared extemporaneously, in situ, and used before they decompose;
- it is possible to minimize still further adverse changes to the solid material and grafting reagents by using an inert gas or gaseous mixture, in particular nitrogen, to form the gas stream;
- the reaction takes place without any solvent or catalyst, and only generates products which are easy to treat and therefore present no safety or environmental problems;
- the reaction may be carried our with many commercial reagents, which are for the greater part low in cost;
- in many cases, the treated material does not require any washing or subsequent treatment;
- the method is very simple and does not require the use of strictly anhydrous conditions or an inert atmosphere, or a confinement chamber, and in most cases the ambient air may be used as the carrier gas and the solid material may be used without previous drying;
- all the surface accessible to gases and only this, is treated, and the result is greater efficiency of the grafting agents for modifying the surface properties of the materials;
- the absence of solvent makes it possible to treat materials containing components sensitive to solvents;
- in many cases, it is possible to work under atmospheric pressure, at average temperatures, with ambient air as the gas stream and using very small quantities of commercial grafting reagents. The method is thus extremely simple to apply and very economical and it makes it possible in particular to carry out the large scale continuous treatment of materials with low added value, such as paper or sawdust;
- it is possible to treat large areas of solid material easily in situ, whether continuously or not;
- the materials treated according to the invention have hydrophobic properties of better quality than those obtained by previous methods in the liquid phase or in the static vapor phase and it is possible in particular to graft hydrophillic groups having a large number of carbons, the reaction yield increasing with the number of carbons.

The invention may thus make it possible to obtain a solid material containing on all its specific area accessible to the gases, and solely on this surface, hydrophobic groups grafted in a covalent manner which can include between 8 and 50 carbons. In particular, the invention concerns a material formed of an inorganic structure, in particular glass.

Such a solid material could not be obtained in the prior art.

It should be noted in particular in the case of material which can be treated in depth, in particular cellulosic materials, that the level of grafting obtained in the liquid phase with the reactions described in the prior art are largely superior to the levels of grafting obtained with the treatment according to the invention corresponding to the grafting of hydrophobic groups over all the specific area accessible to gases and solely on this area. In spite of this, the hydrophobic character of a material according to the invention is improved.

The invention applies in this respect to very many different solid materials. Accordingly, a solid material according to the invention may be:

- a solid material permeable to gases, the method according to the invention not affecting the gas permeability property of the material,
- a solid biodegradable material, the method according to the invention not affecting the biodegradability properties of the material,
- a coloured solid material, the method according to the invention not affecting the colour of the material,
- a solid material essentially formed of crosslinked polymeric macromolecular material(s) (when sufficient durability of the hydrophobic character is desired) or even non-crosslinked polymeric macromolecular material(s) (if durability is not desired or on the other hand if low durability is desired),
- a solid material essentially formed of cellulosic materials,
- a solid material formed of a natural or artificial fibrous structure being in the form of a sheet or divided form in particular paper, a wood-based structure, or a textile structure, impermeable to water and to aqueous solutions and/or absorbing fats,
- a solid material formed of a porous or non-porous inorganic structure, in particular glass or silica.

It should also be noted that the solid material according to the invention may be porous or fibrous, but it is not necessarily porous or fibrous. In particular, the solid material according to the invention may also be made of glass (as a sheet, plate, block or as glass wool), or of silica. In the case of glass, glass is obtained with a hydrophobic free outer face, namely one which does not retain water. The durability of the hydrophobic character is extremely great.

In the field of the treatment of silica based products, the invention may be used for modifying the surface properties of windows and in particular automobile windshields.

In point of fact, many polar SiOH functions exist on the surface of the glass, which makes it possible for water to wet the surface of the glass. In the case of rain, the visibility through windshields is considerably impaired due to the large size of the drops resulting from the wettability of the glass, and it is of course necessary to use windshield wipers. A considerable number of projects have been carried out to make the surface of the glass more hydrophobic and to encourage the dispersal of the water droplets. Previous techniques considered rely either on a simple waxy coating or on the production of a polymeric film on the surface of the glass.

The invention makes it possible to obtain an excellent hydrophobic character on windshields. The hydrophobic character obtained is, in particular, durable in nature and which makes it possible to increase greatly the visibility through the windshield over a period of at least six months under normal conditions of use.

Accordingly, the invention concerns a solid material formed of an inorganic structure, in particular glass or silica, comprising over all its specific area accessible to gases and only on this area, hydrophobic groups grafted in a covalent manner, these hydrophobic groups including between 8 and 50 carbons.

The invention also extends to a windshield treated according to the invention, namely a vehicle windshield, wherein it is at least partially formed of a glass comprising at least one face intended to be in contact with the weather which is made hydrophobic by the covalent grafting of hydrophobic groups having 8 to 50 carbons.

Advantageously and according to the invention, at least one part is treated of one face of the vehicle windshield intended to be placed in contact with the weather.

The invention may be the subject of very many other practical applications. A cellulosic fibrous structure according to the invention may accordingly for example serve to provide undergarments, towels or protective pilches.

In addition, it may serve to provide dressings impermeable to water and to aqueous solutions and permeable to gases. Such a dressing is particularly effective in as much as it prevents any bacterial contamination by aqueous solutions and facilitates healing, taking into contact its gas permeability properties.

The invention makes it also possible to obtain, in an alternative manner to previously known waterproofing methods, clothing which is impermeable to water and more particularly clothing permeable to liquid water and permeable to air. More generally, the invention makes it possible to obtain textile structures impermeable to water and permeable to air.

The invention also makes it possible to obtain a hydrophobic paper permeable to gases, which may or may not be biodegradable and which may or may not be coloured. Such a paper may be the subject of very many applications, and in particular for packagings impermeable to water and aqueous solutions and permeable to air, or for a package or bag impermeable to water and to aqueous solutions, which is biodegradable, etc.

In particular, the invention is applicable to the obtaining of printing paper. Printing paper commonly used in printers, photocopiers, and in printing works and for writing must have a partially hydrophobic character. The aim of this is to permit the diffusion of water-based inks into the texture of the paper but in a controlled manner so that the ink does not spread out as may be observed for example on blotting paper. This partially hydrophobic character is obtained in the prior art by adding hydrophobic additives such as alkyl ketene dimers, long chain derivatives of succinic anhydride or compounds of the rosin family. All these compounds are added to the cellulose in aqueous suspension which presents considerable technical problems taking into account the strongly hydrophobic and water insoluble character of these additives. It is thus desirable to have available a method which will enable this partially hydrophobic character to be provided with a method not requiring an aqueous suspension. This partially hydrophobic character may be provided by a method according to the invention using smaller quantities of grafting reagents than those necessary in the prior art to obtain a barrier effect. The properties obtained as regards the absorption of water and inks and printing qualities are at least as good as those obtained with a traditional commercial printing paper.

In addition, since a solid material according to the invention is hydrophobic, it is in general also lipophilic. Accordingly, the solid material according to the invention may be applied in all cases where fat absorption properties are desired.

In particular, the invention makes it possible to obtain a solid composition in divided form absorbing hydrocarbons. More particularly, the invention applies to the obtaining of such a solid composition in divided form absorbing hydrocarbons and having a density less than that of water. For example, the invention makes it possible to obtain a hydrophobic wood chip or sawdust composition absorbing hydrocarbons and oils and capable of floating on the surface of water. Such a composition may serve in particular for the treatment of water pollution by hydrocarbons. The inventor has found that such a composition makes it possible to absorb very large quantities of fats, of the order of 10 to 20 times its own weight.

The invention also concerns a treatment method and a solid material wherein all or part of the characteristics mentioned above and hereinafter are combined.

BRIEF DESCRIPTION OF THE DRAWINGS

Figures accompanying 1 to 4 are diagrams illustrating, by way of non-limiting examples, four different embodiments respectively of a method according to the invention.

DESCRIPTION OF THE PREFERRED EMBODIMENTS

Figure 1:
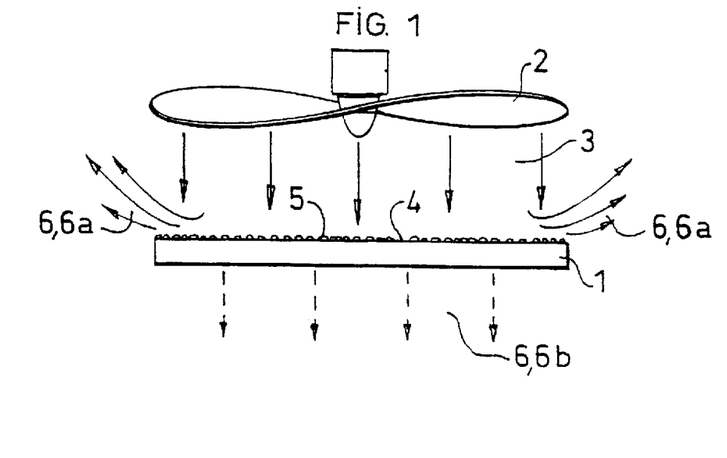

In FIG. 1, a sample of solid material such as a glass plate, a piece of paper or other material is placed under a rotating fan 2 directing a gas stream 3, for example formed of atmospheric air at ambient temperature, onto a free outer face 4 of the sample 1, on which a microdispersion 5 has already been formed of a liquid composition of at least one grafting reagent for example by means of an absorbent pad impregnated with a liquid composition applied with pressure onto the face 4. The gas flow 6 coming from the sample 1 is formed of the reflected flow 6a and the flow 6b having passed through the sample 1 if the latter is porous. These flows 6a, 6b are evacuated either to the open air as shown or into an extraction hood if the assembly is placed under a hood. If the sample 1 is porous, it is treated throughout all its thickness. If it is not porous, only its face 4 is treated.

Figure 2:
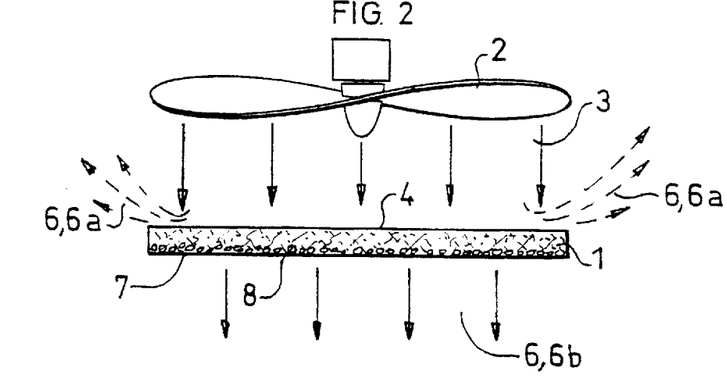

In the variant of FIG. 2, a microdispersion 8 is prepared of a liquid composition of grafting reagents on the face 7 opposite the face 4 receiving the gas stream 3. The sample 1 is porous and the gas stream 3 passes though its thickness. The microdispersion 8 diffuses when it is produced over a certain thickness within the sample. It then evaporates as the treatment with the gas stream 3 continues. Only the face 7 is made hydrophobic in this way.

Figure 3:
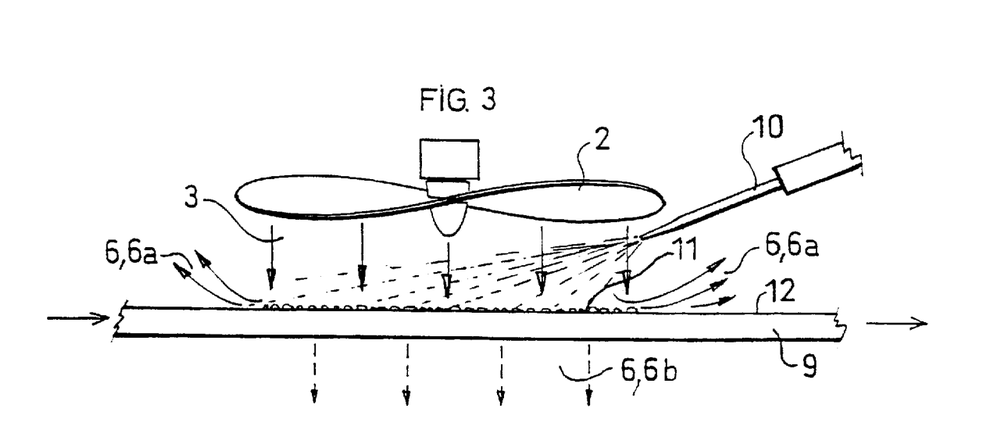

FIG. 3 illustrates a continuous method for producing a strip 9 of solid material (such as printing paper) in which a spray nozzle 10 is used to spray the liquid composition of grafting reagent(s) onto the part 11 of the free outer face 12 of the strip 9 which passes in the gas stream 3 formed by the fan 2. Preferably, the spray nozzle 10 is inclined counter-currently to the direction of movement of the strip 9 under the fan 2.

As a variant, not shown, the nozzle 10 could also be placed upstream to the gas stream 3 with respect to the direction of movement of the strip 9. The treatment then comprises two successive stations: a spraying station followed by a station for applying the gas stream 3.

Figure 4:
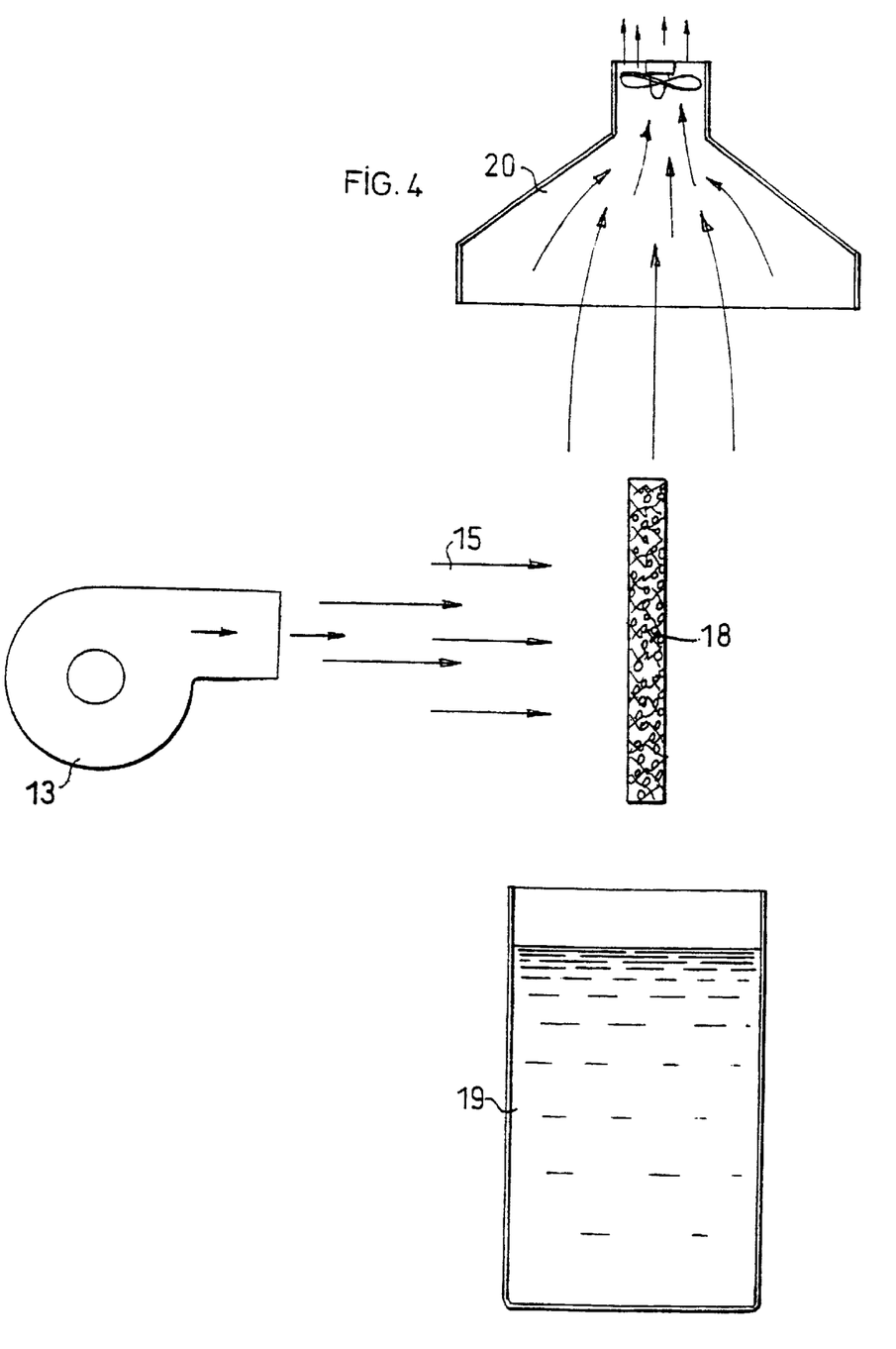

In the variant of FIG. 4, a blower 13 is used, which may be provided with means for heating the gas stream 15, for example electric resistances. The sample 18 has been previously wetted with a liquid composition of grafting reagent (s) contained in a vessel 19 by simply soaking it instantaneously in the bath of the vessel 19. The sample 18 is placed under an extraction hood 20.

This variant may be used with a porous sample 18 which is then treated throughout its thickness. Several blowers 13 may be used to treat each large face of the sample 18.

The variant of FIG. 4 may also be used with a non-porous sample, the liquid composition being formed of a highly diluted solution of grafting reagent(s) in a neutral volatile solvent evaporated by the gas stream, or before applying the gas stream, so as to leave only a microdispersion on the surface.

The examples given below illustrate the invention in a non-limiting manner.

EXAMPLE 1

A sample was taken of Whatman $n^o$ 2 filter paper, approximately 10 cm×10 cm in size and weighing 1.034 g. This sheet was impregnated with 1 ml of a 0.2% (weight/volume) solution of stearic acid chloride in anhydrous pentane. After evaporating the pentane in air, the sheet was placed above a sintered glass under which a slight vacuum was maintained by means of a liquid jet vacuum pump, and a stream of hot air (at 80–100° C.) was passed by means of a laboratory hair drier through the sheet for a few seconds. Although the appearance, handle and mechanical strength of the paper apparently remained exactly identical to the original sample, it was found that the paper had become hydrophobic and was not wetted when water was poured over it, whilst any odour of stearic acid chloride had disappeared. The paper was then immersed successively in a bath of chloroform, acetone and ethyl alcohol and was then dried and retested for its hydrophobic character. This was unchanged after the washing cycle.

The experiment was repeated but using stearic acid in place of stearic acid chloride. The paper then had practically no hydrophobic character.

This experiment demonstrated that the hydrophobic character was indeed due to the covalent grafting of the stearyl group onto the fibres of the paper.

EXAMPLE 2

A 10 cm square piece of Whatman $n^o$ 2 filter paper was impregnated with a 0.4% (weight/volume) solution of stearic acid chloride in pentane. After evaporating the pentane, two untreated squares of paper, identical to the first, were placed above a sintered glass under which a slight vacuum was maintained. The paper which had been impregnated with the reagent was placed on these two pieces placed one on the other, and a stream of hot air was passed through the three thicknesses for a few seconds. It was found that the three squares had become hydrophobic although the one which was completely underneath had had no direct contact with the one above it. This experiment demonstrated that acylation was indeed achieved by diffusion of the reagent, associated with entrainment by the gas stream.

EXAMPLE 3

The experiment of example 2 was repeated ten times in succession with three paper circles having the same diameter as the sintered glass and the sample which was never in contact with the reagent was weighed between each experiment. The results obtained were as follows:

Initial weight of the paper sample(after dehydration): 0.816 g,

Quantity of stearic acid chloride used in each cycle: 20 mg.

| Cycle  | 0     | 1     | 2     | 3     | 4     | 5     | 6     | 7     | 8     | 9     |
|--------|-------|-------|-------|-------|-------|-------|-------|-------|-------|-------|
| Weight | 0.816 | 0.821 | 0.819 | 0.820 | 0.821 | 0.820 | 0.821 | 0.819 | 0.821 | 0.820 |

The increase found in the weight was very low, less than 0.6%, and did not increase with the number of acylations. This experiment demonstrated that grafting of a fatty acid in the gaseous phase only required a small quantity of reagent in order to form derivatives of all the available sites. It was moreover found that formation of derivatives was quantitative from the first acylation cycle.

Comparative Example 4

A sample of thick filter paper (Hoefer Scientific Instruments, San Francisco, ref. 98087) having a weight of 6.700 g, was immersed in a solution of acid chloride (4 g) in chloroform (200 ml) in the presence of 4 g of DMAP.

The sample was extracted regularly, washed, dried, weighed and then left to react. The results obtained were as follows:

|        | Time (days) | | | | |
|--------|-------|-------|-------|-------|-------|
|        | 0     | 1     | 2     | 4     | 7     |
| Weight | 6.700 | 6.715 | 6.732 | 6.740 | 6.747 |

A slow but regular increase in weight was found which reached 7% at the end of a week. The hydrophobic character did not however increase significantly.

This experiment showed that, with example 3, the products obtained by the method in the liquid phase were distinct in nature from those obtained by a method according to the invention.

Comparative Example 5

A sample of paper was immersed in a 1% (weight/volume) solution of stearic acid chloride in pentane. At the end of half an hour, the sample was extracted, rinsed, dried and tested for its hydrophobic character. No significant hydrophobic character was observed.

This experiment demonstrated that the kinetics of the reaction in a liquid medium, and without an agent for trapping HCl, was much slower than with a method according to the invention in the vapor phase.

Example 6

A drop of a 0.5% (weight/volume) stearic acid chloride solution in pentane was deposited on a sheet of filter paper. The limit reached by the solvent on the sheet before it evaporated was marked with a pencil. The sheet was then placed in a ventilated oven at 150° C. for 15 seconds and tested for its hydrophobic character. A hydrophobic zone was found having a diameter twice as great as that reached by the solvent.

In another experiment, a stream of hot air coming from a hair drier was directed for a few seconds at the zone on which the drop had been deposited, while keeping it at an oblique angle. A hydrophobic trail was noted in the direction of the stream of hot air.

This example demonstrated the existence of reagent diffusion phenomena which were associated with entrainment by the gas current.

Example 7

100 mg of Pharmacia Sephadex G10 (registered tradename) particles were impregnated with 0.5 ml (weight/volume) of a solution of 0.5% stearic acid chloride in pentane. After evaporating the solvent, the particles were placed for 15 seconds in an oven at 150° C. or placed in a fluidized bed at a temperature of 100° C. for 30 seconds. It was observed that the particles of G10 were very hydrophobic and remained on the surface of the water for several hours.

The particles were then put into contact with a 10 mM Hecameg (registered tradename) detergent solution. It was observed that the particles were wetted and settled to the bottom of the container. The particles were then washed several times with distilled water and dried by washing them first of all with alcohol and then with ethyl ether. When the dry particles were put back in water, it was observed that they had the same behavior as initially and floated on the surface.

Particles of Pharmacia Sephadex G100 (registered tradename), which were much less crosslinked than the G10 particles, were treated in exactly the same way as the particles of G10. It was found that the G100 particles exhibited a hydrophobic character as did the G10 particles, but only in a transitory manner and they sank after a few minutes. After treatment with detergent followed by washing and drying, it was found that the particles had lost all their hydrophobic character.

These experiments demonstrated the fundamental importance of the effect of crosslinking on the durability of the orientation of fatty acids and the resulting hydrophobic character.

Example 8

A 5 mm diameter Pipetman (registered tradename) P5000 (Gilson) filter was taken which was fitted onto a Pasteur pipette. The end of the filter was dipped in a solution of pure stearic acid chloride so that only a very small quantity (50 mg) was absorbed by the filter (which was weighed before and afterwards). Absorption was allowed to proceed for a few minutes so that all the reagent was completely absorbed by the filter. The end of the filter was then applied to a piece of paper for one second while exerting moderate pressure. The paper was then placed in a ventilated oven at 150° C. for 15 seconds and the hydrophobic character of the paper was tested. The presence of a hydrophobic spot was found around the place where the end of the filter had been applied, the diameter of the hydrophobic spot being 1 cm, i.e. twice as great as the diameter of the filter. Another experiment was performed in the same manner but with the sample being left in the air. After two minutes, the sample was tested for its hydrophobic character. A hydrophobic spot was then found but it had the same diameter as that of the filter. The spot had moreover irregularities due to imperfect application.

In another experiment, multiple applications were carried out with the end of the filter over all the surface of the paper, each application being separated from the following one by an interval of 5 mm. The paper was then placed in an oven at 150° C. for 15 seconds and the paper was tested for its hydrophobic character. It was found that all the piece of paper had become hydrophobic.

50 mg of reagent were sufficient to treat more than 50 g of paper in this way, namely a ratio of 1/1000.

These experiments indicated that a temperature of 150° C. (as against ambient temperature) strongly accelerated the kinetics of the reaction and diffusion of the reagent into the material and brought about complete treatment of the sample by ensuring good diffusion of the reagent.

EXAMPLE 9

Angles of contact measurements.

These measurements were carried out with a Krüss (registered tradename) water droplet apparatus. The angles of contact at the leading edge were measured as a function of the nature and degree of acylation of the materials treated according to the invention and were followed over a period of 10 minutes. The following tables give the values of the angles of contact (in degrees) obtained as a function of time, and according to the percentage of reagent used, based on the paper weight.

* With a laboratory "Soft, Katrin" paper from Metsä-Serla (Sweden):

| Time (min) | Percent of reagent | | |
|---|---|---|---|
| | 0.1% | 0.4% Right/left | 1% |
| 0 | 145.3 | 145.2–145.2 | 146.3 |
| 2 | | 143.9–143.9 | |
| 3 | | 143.0–143.0 | |
| 4 | | 141.9–141.9 | |
| 5 | | 140.1–140.1 | |
| 6 | | 138.9–139.9 | |
| 7 | | 136.8–136.8 | |
| 8 | | 134.2–134.2 | |
| 9 | | 132.7–132.7 | |

* With a Whatman n° 2 paper:

| Time (min) | Percentage of reagent | | |
|---|---|---|---|
| | 0.1% Right/left | 0.4% | 1% |
| 0 | 134.1–134.1 | 131.6 | 128.7 |
| 1 | 131–131 | | |
| 2 | 129.3–139.3 | | |
| 3 | 125.8–125.8 | | |
| 4 | 123.1–123.1 | | |
| 5 | 118.5–118.5 | | |
| 6 | 112.7–112.7 | | |
| 7 | 108.4–108.4 | | |
| 8 | 97.6–97.6 | | |
| 9 | 88.9–88.9 | | |

* With a thick paper (Hoefer Scientific Instruments, San Francisco, ref. 98087):

| Time (min) | Percentage of reagent | | |
|---|---|---|---|
| | 0.1% | 0.4% Right/left | 1% |
| 0 | 147.2 | 147.9–147.9 | 148.2 |
| 1 | | 146.8–146.8 | |
| 2 | | 145.4–145.4 | |
| 3 | | 144.3–144.3 | |
| 4 | | 142.7–142.7 | |
| 5 | | 139.4–139.4 | |
| 6 | | 138.3–138.3 | |
| 7 | | 133.9–133.9 | |
| 8 | | 128.9–128.9 | |
| 9 | | 122.1–122.1 | |

All the results obtained indicated that the papers on which derivatives were formed by fatty acids had a very marked hydrophobic character. As a comparison, the angle of contact of paraffin was only 110°.

The value of this angle was stable with time (taking into account the evaporation of water from the droplet) which indicated good resistance of the material to wetting.

These results also indicated that the nature of the starting material and the actual structure of the cellulose fibres played an important part in the hydrophobic character of the final product.

These results moreover confirmed the fact that derivatives of the materials were completely formed by means of very small quantities of reagent and that the use of larger quantities did not significantly improve their hydrophobic properties.

EXAMPLE 10

Crosslinking of Whatman n° 2 paper.

A 10 cm×15 cm sample of paper was taken which was impregnated with 0.5 ml of epichlorohydrin. The sample was then hydrated with 1 M sodium hydroxide and placed between two glass plates which were held tightly together with the aid of clamps. After two hours at ambient temperature, the plates were taken apart and the sample was washed with distilled water so that the wash water had a completely neutral pH. Crosslinking resulted, as predicted, in a very significant increase in the mechanical strength of the paper in the wet state. The paper was then dried and acylated with stearic acid chloride by means of one of the methods described in the preceding examples.

The previously obtained crosslinked and acylated paper was wetted with a detergent solution (40 mM Hecameg-registered trade name) and left in contact with this solution for 2 h. The sample was then washed with distilled water, dried and tested for its hydrophobic character. It was found that this was unchanged compared with the starting paper.

The same experiment was performed with non-crosslinked paper. After drying, the product was tested for its hydrophobic character. It was found that this was very much reduced compared with the initial sample.

These experiments showed that the crosslinked paper had a much more durable hydrophobic character which persisted after treatment with a detergent.

On the other hand, the hydrophobic character of the non-crosslinked paper was strongly reduced by the detergent treatment.

EXAMPLE 11

The same experiment as that in example 10 was performed with a piece of jute fabric. Crosslinking resulted in improved strength of the fabric and less sensitivity to crumpling. The results were similar in terms of the durability of the hydrophobic character. The fabric could then be washed with a detergent without losing its hydrophobic properties.

EXAMPLE 12

Determination of water barrier properties.

A sample of Whatman n° 2 paper, acylated according to the invention as indicated previously, was shaped into the form of a conical filter and placed over a beaker. 50 ml of distilled water were poured into the cone. At the end of a week it was found that the water contained in the cone had entirely evaporated without having passed through the thickness of the paper.

The same experiment was performed with a 1M NaCl solution. The water also evaporated leaving NaCl crystals behind it.

The same experiment was performed with a 5% (weight/volume) aqueous solution of bovine serum albumen. The water evaporated leaving behind grains of albumen. This experiment demonstrated that the hydrophobic properties were remarkably stable and insensitive to ionic strength.

EXAMPLE 13

A sample of paper, acylated according to the invention (according to one of the preceding examples), was disintegrated mechanically in the presence of water with an apparatus of the domestic type. A homogeneous aqueous suspension was obtained. This suspension was brought to the boil and it was found that the fibres trapped air bubbles produced by degassing the suspension, and rose to the surface where they formed a cake. This phenomenon was characteristic of fibres of acylated paper and was not observed with paper fibres not previously treated by a method according to the invention.

EXAMPLE 14

The suspension of homogenized acylated paper obtained in example 13 was treated with sodium hydroxide concentrated so as to obtain a 1M NaOH solution. The resulting suspension was stirred slowly for 24 h. The fibres were then decanted off, washed and put back into suspension. This suspension was then brought to the boil in the same manner as in the previous example. It was noted that the fibres did not trap air bubbles and did not rise to the surface. Their behaviour was then identical to that of non-acylated fibres.

This experiment showed that the grafted fatty acids were hydrolysed in a basic medium to give the starting cellulosic matrix.

EXAMPLE 15

Determination of air permeability properties.

A piece of Whatman n° 2, acylated according to the invention, was cut out so that it had the same diameter as filters used for Amicon (registered tradename) ultrafiltration cells. After having filled the cell with 1 cm of distilled water, the outlet tube was connected to the pressure reducer of a nitrogen bottle. It was found that as soon as pressure, even a low pressure, was applied, air bubbles were disengaged from the paper. On the other hand, water did not pass through the filter, even in the absence of a counter-pressure.

This experiment showed that the treatment according to the invention did not at all adversely affect the air permeability properties of the initial material.

EXAMPLE 16

Determination of organic solvent permeability properties.

A sample of Whatman n° 2 paper, acylated according to the invention, was shaped into the form of a conical filter. The following solvents were poured in sequentially: chloroform, petroleum ether, ethyl alcohol and acetone. None of these solvents was retained by the filter.

An emulsion of petroleum ether and water was prepared and this emulsion was poured onto the acylated paper filter. It was found that the filter held back the water present in the emulsion but allowed the petroleum ether to pass.

EXAMPLE 17

Determination of the properties of affinity for hydrocarbons and fats.

100 ml of water and 1 ml of triolein (olive oil) were placed in a 250 ml beaker. The triolein then formed a superficial film on the surface of the water. 100 g of Whatman n° 2 paper, acylated according to the invention and cut up into thin strips, were introduced and deposited on the film of triolein. It was found that the paper took up all the quantity of triolein present. A type of pasty cake formed which could be removed from the water with a spatula.

The same experiment was performed with 1 ml of crude petroleum oil with the same results.

These experiments illustrated the affinity, in the presence of water, of fats or hydrophobic materials for materials treated according to the invention.

EXAMPLE 18

A comparative biodegradability test was performed on a control sample of untreated paper and on a similar sample of paper treated according to the invention (as in one of the preceding examples).

Each sample was put into suspension in an inorganic solution, at a rate of around 50 mg of carbon i.e. around 120 mg of paper (cut into squares of around 0.5 cm sides). The exact determination was carried out by elemental analysis. The medium was then seeded with a microbial inoculum, consisting of an activated sludge supernatant (pre-aerated for 4 hours, homogenized for 2 minutes and then decanted for 1 hour), coming from the secondary effluents of a water purification station. Incubation took place with aerobiosis, by aeration with air free of $CO_2$. The temperature (23° C.), stirring (350 revolutions per minute), pH (7.2) and aeration were kept constant.

Biodegradability was followed by measuring the emission of $CO_2$.

The quantities of carbon, in the form of paper introduced, were respectively 48.8 mg for the control and 48 g for the sample treated according to the invention. The results were as follows:

|  | CONTROL | | TREATED SAMPLE | |
|---|---|---|---|---|
| Duration of the test in days | Carbon trapped in mg (cumulative values) | % biodegrad-ability | Carbon trapped in mg (cumulative values) | % biodegrad-ability |
| 0 | 0.00 | 0.00 | 0.00 | 0.00 |
| 1 | 2.04 | 4.18 | 3.60 | 7.50 |
| 3 | 15.58 | 34.15 | 21.24 | 44.25 |
| 5 | 22.08 | 45.21 | 25.98 | 55.21 |
| 7 | 31.32 | 54.13 | 35.90 | 74.79 |

This experiment demonstrated that the two samples were biofragmentable since they disappeared during the test (grafting did not impair the accessibility of cellulose to cellulases). The method according to the invention did not impair the biodegradability properties.

EXAMPLE 19

An infrared spectrum was obtained of a sample of Whatman n° 2 paper, before and after treatment according to the invention, by the so-called multiple reflection technique which made it possible to analyze only the surface of a sample. The appearance was noted of two intense bands at 2918 and 2848 $cm^{-1}$ corresponding to C—H vibrations. These bands were similar to those observed with the spectrum of stearic acid. Surprisingly, on the other hand, no intense band was noted in the carbonyl region between 1715 and 1750 $cm^{-1}$. This band was probably displaced following the formation of hydrogen bonds with the hydroxylated functional groups of which derivatives had not been formed.

This spectrum indicated that the grafting of fatty acids was indeed localized to the surface of the fibres.

EXAMPLE 20

Acylation was performed according to the invention on samples of Whatman n° 2 paper with acid chlorides having C2, C4, C6, C8, C10, C12, C16 and C18. All the samples were hydrophobic from the acid chloride having C8. No significant reaction appeared to be produced with acetyl chloride (C2).

EXAMPLE 21

Acylation was performed according to the invention on hydrophillic cotton, sawdust, a piece of board, a cellulose acetate filter and Cellophane with stearic acid chloride in a stream of hot air coming from a hair drier as indicated in previous examples. All these materials became hydrophobic after treatment.

EXAMPLE 22

Sililation was performed according to the invention on glass wool with diethyloctadecyl chlorosilane in a current of hot air coming from a hair drier as indicated in previous examples. A particularly hydrophobic material was obtained which could not be wetted with water.

EXAMPLE 23

Acylation was performed according to the invention on Whatman n° 2 paper with behenic acid chloride, behenic acid being a fatty acid with a saturated linear chain having C22. To this end, 500 mg of behenic acid were dissolved in 100 ml of chloroform in the presence of 500 mg of acetyl chloride. At the end of 15 minutes, a sample of paper was impregnated with the chloroform solution, the solvent was allowed to evaporate and a stream of gas at 150° C. was passed over the sample for 15 seconds. The presence of an excess of acetyl chloride made it possible, by means of a transchlorination reaction, to prepare behenic acid chloride extemporaneously. The excess of acetyl chloride was then eliminated by the gas stream by virtue of its high volatility. The very short dwell time of the acetyl chloride was, moreover, not sufficient for it to react significantly with the support. It was found that behenic acid was efficiently grafted onto the paper sample while providing a hydrophobic character very significantly greater than that provided by stearic acid.

The experiment indicated that it is possible to prepare non-commercial or fragile acid chlorides simply by transchlorination and then to react them under good conditions. This experiment also showed that the hydrophobic properties depended very much on the chain length of the fatty acids. It also indicated that acetyl chloride, the boiling point of which is below 200° C., did not allow treatment to take place, contrary to behenic acid.

EXAMPLE 24

The same experiment as in example 23 was carried out with melissic acid which includes a saturated linear chain with C30. A hydrophobic character was obtained even greater than that with behenic acid.

This experiment confirmed that hydrophobic character was a function of the chain length of the fatty acid and that the reaction took place normally even with high molecular weight fatty acids.

EXAMPLE 25

1 g of heptafluorobutyric acid chloride was mixed with 0.4 g of 6-amino caproic acid and 0.3 g of DMAP dissolved in 10 ml of chloroform. After 1 h at ambient temperature, 10 ml of water were added and the chloroform phase was decanted off and washed twice with 10 ml of water. The chloroform phase was then dried. 100 ml of dry chloroform and 1 g of acetyl chloride were then added. These were allowed to react for 15 minutes and a piece of paper was impregnated with the chloroform solution obtained. The solvent was evaporated and a stream of gas was applied at 50° C. to the piece of paper for 30 seconds. It was found that the paper had acquired hydrophobic properties and also oleophobic properties. It was in point of fact no longer capable of absorbing hydrophobic compounds.

EXAMPLE 26

A reaction was carried out by impregnating a piece of paper with a solution of 2-sulfonyl naphthalene chloride and 2-naphthoyl chloride (10 mg/ml) in chloroform, and by applying a stream of hot air with the aid of a hair drier. Grafting of these compounds onto the surface of the paper was obtained in both cases.

This experiment demonstrated that the reaction could be carried out with a variety of compounds.

EXAMPLE 27

A piece of thick filter paper (Hoefer Scientific Instruments, San Francisco, ref. 98097) was taken, and pure stearyl chloride was applied with a pad to one of its faces. A stream of hot air was then applied with the aid of a hair dryer to the face opposite that on which the pad had been applied. The gas stream was reinforced by placing the face of the sheet on which the reagent microdispersion had been applied, onto a sintered glass where a slight vacuum was maintained. The hydrophobic character was then tested on both faces of the sheet. It was found that the face where the acid chloride had been applied had become hydrophobic whereas the opposite face remained hydrophillic.

EXAMPLE 28

A mixed anhydride was prepared by adding one gram of stearic acid to a solution of one gram of acetic anhydride in 50 ml of chloroform. The mixture was allowed to equilibrate for 12 h and a piece of Whatman n° 2 paper was then impregnated with the solution and the stream of gas was applied. It was found that the pa per had become hydrophobic but to a much less pronounced extent than with stearic acid chloride.

EXAMPLE 29

A 10 cm high piece of Whatman n° 2 paper, acylated according to the invention with stearic acid chloride, was introduced into a tank containing 1 cm of water. A piece of untreated paper of the same dimensions was also introduced. After 2 h, it was observed that the water had risen by capillarity to the top of the untreated sample but had not risen at all along the treated sample.

This experiment indicated that the treatment according to the invention made it possible to inhibit the wetting of papers and cards by capillarity.

EXAMPLE 30

The exchanger plate of a refrigerator was partially covered with a sheet of Whatman n° 2 paper, acylated according to the invention with stearic acid chloride, and the appliance was started with the door left open. At the end of one hour, it was found that the part of the exchanger situated under the sheet was covered with frost as well as the part of the exchanger not covered with the sheet. The quantity of frost was identical to that found under a control sheet of untreated paper.

This experiment demonstrated that water in the form of vapor was capable of passing through sheets of paper acylated according to the invention in the same way as through untreated sheets of paper.

EXAMPLE 31

A control sample of untreated Whatman n° 2 paper and another previously acylated according to the invention with stearic acid chloride were impregnated with molten beeswax. The two samples were then placed in a receptacle containing boiling water. It was found that the wax remained completely attached to the piece of paper acylated according to the invention whereas it was completely detached from the control piece.

In another experiment, wax was introduced into boiling water where it melted, and two samples were then added (treated according to the invention and untreated). The untreated sample immediately sank to the bottom of the receptacle whereas the treated sample remained on the surface and absorbed all the wax. This experiment indicated that the affinity of the paper for fats had been completely reversed by the treatment according to the invention, even in the presence of boiling water.

EXAMPLE 32

A commercial silicone-based waterproofing treatment spray (tradename DECATHLON® was applied to a sample of Whatman n° 2 paper, acylated according to the invention with stearic acid chloride, and to an untreated sample. It was found that the non-acylated sample had become hardly hydrophobic at all, whereas the acylated sample saw its hydrophobic character, already strong, reinforced even more by treatment with the waterproofing spray.

EXAMPLE 33

A sheet of 80 gram paper was taken which was untreated with agents to make it hydrophobic. A 10 cm×10 cm square was immersed briefly in a 0.05% (weight/weight) solution of palmitic acid chloride in petroleum ether. After evaporating the solvent, the paper was placed in a ventilated oven at 150° C. for 10 seconds. The water absorption capacity was then measured by placing the paper for one minute in a jar filled with water and weighing the paper before and after the hydration step. The results obtained were as follows:

|  | % hydration (weight of water/weight of paper) |
| --- | --- |
| Untreated paper | >100 |
| Commercial printing paper (in the development state) | 51 |
| Paper treated according to the invention | 49 |

It was found that the absorptive capacity of the paper treated by the invention was very similar to that of the traditional commercial printing paper.

EXAMPLE 34

Treatment of a commercial float glass.

The surface to be treated was first of all cleaned and activated by applying a commercial household cleaner, such as a cooker degreaser, for 30 min. The surface was then rinsed with demineralized water and dried by blowing dry air at 110° C. A 0.04% solution of chlorosilane in anhydrous 80/100 petroleum ether was then deposited on the surface to be treated. 1 ml was sufficient to treat an area of 30 cm×30 cm and the solution was spread out over the surface until the solvent had completely evaporated. The reaction was then ended by applying a stream of dry air at 150° C. for a few seconds. Controls were prepared by treating samples of glass activated by immersion for one hour in the chlorosilane solution in the presence of 0.3% anhydrous pyridine. All the samples were then washed by soaking them in baths of chloroform and then methanol and were finally dried in the air. The hydrophobic character obtained was evaluated by determining the angle of contact at the leading edge. The results obtained were as follows:

|  | Control (liquid phase treatment) | Method according to the invention |
| --- | --- | --- |
| Dimethyl octadecyl chlorosilane | 108° | 110° |
| Octadecyl trichlorosilane | 112° | 112° |

It was found that the angles of contact obtained with the two reagents were practically identical. This indicated that modification of the surface state had indeed taken place by means of molecular grafting between the SiOHs of the surface of the glass and the reagents and not by the formation of a polymeric film. Indeed, in the latter case, the results obtained with the trichlorinated reagent would have been very much greater than those obtained with the monochlorinated reagent which is incapable of forming polymerization bonds.

A windshield was treated by the same method but using perfluorooctyl trichloroslane which enabled an even lower surface energy to be obtained. This treatment was carried out without the necessity for removal or for complex equipment. It was found that the hydrophobic character obtained was then maintained for a period of at least 6 months (from December to June) under normal conditions of daily use of the vehicle.

EXAMPLE 35

Demonstration of the entrainment of the grafting reagent by the gas stream.

A frosted and sanded glass was used on which was deposited a drop of a 0.1% solution of dimethyl octadecyl chlorosilane in 80/100 petroleum ether. When the solvent had completely evaporated, a stream of hot air (150° C.) was applied for a few seconds at the point of deposition but inclined with respect to the perpendicular to the surface. When the glass was then wetted, it was found that the glass had become hydrophobic at the point of deposition but also on the side opposite the origin of the gas stream, forming a sort of comet tail. The latter was larger with dimethyl octadecyl chlorosilane than with octadecyl chlorosilane, representing a higher boiling point than the latter, compared with the monochlorinated compound. This experiment demonstrated that the grafting reagent had been first of all entrained by the gas stream and had then reacted with the part of the glass on which it had been deposited.

EXAMPLE 36

Preparation of oleophobic textiles.

A perfluorinated grafting reagent was first of all prepared in the following manner.

20 g of perfluorooctanoic acid were dissolved in 20 ml of chloroform and 2.5 g of dicyclohexylcarbodiimide were added. After stirring overnight, the dicyclohexyl urea formed was removed by filtration and the anhydride of perfluorooctanoic acid was obtained. The latter was then reacted with 5 g of 11-amino undecanoic acid overnight and 3.5 g of oxalic acid chloride were then added. The following compound was then formed:

$CF_3-(CF_2)_6CONH-(CH_2)_{10}COCl$

A 1% solution of grafting reagent was prepared in chloroform, a piece of cotton fabric was soaked in the solution obtained, the solvent was evaporated and the piece of fabric was subjected to a stream of hot air at 140° C. for seconds. The treated fabric was then washed with acetone and chloroform to remove any trace of unreacted reagent. It was then dried and tested for its oleophobic character by depositing a drop of ground-nut vegetable oil on the surface. It was found that the oil remained on the surface of the fabric without wetting it.

EXAMPLE 37

Aminol dodecane was reacted overnight with succinic anhydride, mole for mole, in chloroform, one equivalent of oxalyl chloride was added and the reaction was allowed to proceed for 4 hours, leading to the following grafting agent possessing a C16 carbon chain:

$CH_3-(CH_2)_{11}-NCO-CH_2-CH_2-COCl$

Five squares of Whatman n° 2 filter paper of 10 cm side were soaked in 1 ml of a 1% (weight/volume) acid chloride solution in pentane, while varying the nature of the fatty acid: myristic, palmitic, stearic and behenic, and in the C16 grafting agent prepared above. After evaporating the pentane, the five samples were placed in a ventilated oven for an identical time of 15 seconds. The samples were washed with acetone to remove the unreacted reagents. The samples were then dried and allowed to re-equilibrate at atmospheric humidity for 4 hours, and the quantity of fatty acid grafted onto the five samples was then weighed, based on the starting weight. The results obtained were as follows:

| Fatty acid | Myristic | Palmitic | Stearic | Behenic | C16 grafting reagent |
| --- | --- | --- | --- | --- | --- |
| Quantity grafted (mg) | 0.5 | 1 | 3 | 5 | 5 |

It was found that the quantity of fatty acid grafted increased in an exponential manner with the chain length and with its polarity, and hence in fact with the boiling point of the grafting reagents.

EXAMPLE 38

Two squares of Whatman n° 2 filter paper were soaked in 1 ml of a 1% (weight/volume) solution of stearic acid chloride in pentane. After evaporating the solvent, one of the samples was placed in a ventilated oven at 150° C. for 15 seconds and the other was left under an extraction hood at ambient temperature (around 20° C. ) overnight. The samples were then washed with several organic solvents to remove any trace of reagent residues, were dried and then left in the air for 4 hours. The quantity of reagent grafted onto the paper was then measured by weighing. The results obtained indicated that an identical quantity of 3 mg had been grafted onto the two papers. This experiment made it possible to verify that the yield of the reaction did not depend on temperature to any extent. On the other hand, the reaction kinetics depended on temperature in an exponential manner.

EXAMPLE 39

A dual-flow spray nozzle was used, fed with pure stearic acid chloride at a liquid flow rate of 0.6 ml/min. The installation was placed under a powerful extraction hood to prevent any contamination with acid chloride aerosol. A piece of Whatman n° 2 filter paper with 10 cm sides was placed under the nozzle at a distance of 10 cm for a period of one second so that a quantity of 10 mg was deposited on the paper. The paper was then placed in a ventilated oven for 15 seconds. The paper was then tested for its hydrophobic character compared with that obtained with example 38 by impregnation with the reagent dissolved in a solvent. It was found that the hydrophobic characters were identical.

This experiment indicated that it was possible to apply the grafting reagent microdispersion by means of an aerosol.

What is claimed is:

1. A method for treating a solid material having a chemical structure which defines reactive protogenic hydrophilic functions accessible to gases, with a view to covalently graft hydrophobic groups onto the hydrophilic functions, the method comprising:

selecting at least one grafting reagent RX, where X is a halogen, and R is a hydrophobic group, said grafting reagent being selected so that it can be in the liquid state at a temperature of at least 200° C. under atmospheric pressure and so that it can react on said hydrophilic functions at least under certain reaction conditions by producing covalent grafting of the hydrophobic groups R onto said hydrophilic functions with formation of a volatile compound HX under the reaction conditions;

producing on at least one part of the solid material, at least one microdispersion of a liquid composition comprising at least one grafting reagent RX; and applying to said microdispersion at a temperature below the boiling point of the grafting reagent RX, at least one gas stream, which is neutral to the grafting reaction of RX on said hydrophilic functions, so that the grafting reaction is carried out by diffusion of the grafting reagent in a heterogeneous medium onto all the hydrophilic functions of the solid material accessible to gases, and only onto these functions.

2. The method according to claim 1, wherein in order to produce the microdispersion, a quantity of liquid composition is applied in contact with at least one first free outer face of the solid material.

3. The method according to claim 1, wherein a gas stream is applied to at least one free outer face of the solid material.

4. The method according to claim 1, wherein at least one microdispersion is produced on the solid material before applying the gas stream to the solid material.

5. The method according to claim 1, wherein the gas stream is applied to the solid material at the same time as at least one microdispersion is produced.

6. The method according to claim 1, wherein at least one microdispersion is produced by spraying directed towards the solid material.

7. The method according to claim 2, wherein at least one microdispersion is produced by contacting the first face with at least one solid support previously loaded with a liquid composition mainly consisting of at least one grafting reagent RX in the liquid state.

8. The method according to claim 7, wherein the solid support is selected from the group consisting of an absorbent pad, a non-absorbent pad, a roller driven in rotation, and a brush.

9. The method according to claim 2, wherein at least one microdispersion is produced by wetting at least one part of the solid material with a liquid composition formed of a solution of at least one grafting reagent RX in a volatile neutral solvent.

10. The method according to claim 1, wherein the gas stream is directed towards at least one free outer face of the solid material with a velocity component perpendicular to said outer face which is not zero; the gas stream being applied to said outer face with an incident velocity which is not zero.

11. The method according to claim 1, wherein the solid material is placed in a treatment space adapted, according to the characteristics of the gas stream, so that the formed compound HX is extracted from the solid material as it is formed.

12. The method according to claim 1, wherein the solid material is placed in a treatment space adapted, according to the characteristics of the gas stream, so that the quantity of the gas flow coming from the solid material which can be once again returned to the solid material by the gas stream is zero or negligible.

13. The method according to claim 1, wherein the gas stream is applied and the gas flow is extracted in open circuit.

14. The method according to claim 1, wherein the gas stream is free from the grafting reagent RX.

15. The method according to claim 1, wherein the gas stream is free from the compound HX.

16. The method according to claim 1, wherein the gas stream is aprotic.

17. The method according to claim 1, wherein the gas stream is air.

18. The method according to claim 1, wherein X is chlorine.

19. The method according to claim 1, wherein R is an organic hydrophobic group containing more than 6 carbons and less than 50 carbons.

20. The method according to claim 1, wherein when the solid material includes a reactive protogenic hydrophilic functions belonging to the group formed of —OH, —$NH_2$ and —SH, at least one grafting reagent RX is chosen for which R is an acyl.

21. The method according to claim 1, wherein at least one grafting reagent RX is chosen from behenic acid chloride and stearic acid chloride.

22. The method according to claim 1, wherein when the material includes reactive hydrophilic functions belonging to the group formed of —SiOH, —OH, —$NH_2$ and —SH, at least one grafting reagent RX is chosen for which R is R1-Si, where R1 is an organic hydrophobic group.

23. The method according to claim 1 for treating a natural or artificial fiber or fibrous structure comprising polymeric macromolecules, wherein a crosslinking treatment of the polymeric macromolecules is first of all carried out.

24. The method according to claim 1, wherein at least one outer face of the solid material is then coated with a hydrophobic composition.

25. An application of a process as claimed in claim 1, for obtaining a solid composition in a divided form, capable of absorbing hydrocarbons, and having a density of less than that of water.

26. An application of a method as claimed in claim 1 for treating paper.

27. An application of a process as claimed in claim 1 for treating at least part of a face of a vehicle windshield designed to be placed in contact with the weather.

* * * * *

UNITED STATES PATENT AND TRADEMARK OFFICE
CERTIFICATE OF CORRECTION

PATENT NO.     : 6,342,268 B1
DATED          : January 29, 2002
INVENTOR(S)    : Daniel Samain It is certified that error appears in the above-identified patent and that said Letters Patent is hereby corrected as shown below:

<u>Title page,</u>
Amend Item [22] to read as follows: -- [22] PCT Filed: Aug. 14, 1998 --.
Add Items [86] and [87] as follows:

```
-- [86]  PCT No.:        PCT/FR98/01808
         §371 Date:      Feb, 14, 2000
         §102(e) Date:   Feb. 14, 2000
   [87]  PCT Pub. No.:   WO99/08784
         PCT Pub. Date:  Feb. 25, 1999 --.
```

Signed and Sealed this

Fifth Day of August, 2003

JAMES E. ROGAN
*Director of the United States Patent and Trademark Office*